(12) United States Patent
Ito et al.

(10) Patent No.: US 9,046,132 B2
(45) Date of Patent: Jun. 2, 2015

(54) GREASE COMPOSITION AND ROLLING BEARING

(75) Inventors: Motohiro Ito, Mie (JP); Yoji Sato, Mie (JP); Hidenobu Mikami, Mie (JP)

(73) Assignee: NTN CORPORATION, Osaka (JP)

( * ) Notice: Subject to any disclaimer, the term of this patent is extended or adjusted under 35 U.S.C. 154(b) by 28 days.

(21) Appl. No.: 13/823,049

(22) PCT Filed: Sep. 9, 2011

(86) PCT No.: PCT/JP2011/070550
§ 371 (c)(1),
(2), (4) Date: Mar. 13, 2013

(87) PCT Pub. No.: WO2012/036076
PCT Pub. Date: Mar. 22, 2012

(65) Prior Publication Data
US 2013/0170777 A1    Jul. 4, 2013

(30) Foreign Application Priority Data

Sep. 13, 2010 (JP) ................. 2010-204738
Apr. 20, 2011 (JP) ................. 2011-094442
Jul. 18, 2011 (JP) ................. 2011-157327

(51) Int. Cl.
| | |
|---|---|
| F16C 19/00 | (2006.01) |
| C10M 169/06 | (2006.01) |
| C10M 137/04 | (2006.01) |
| F16C 33/66 | (2006.01) |
| C10M 169/00 | (2006.01) |
| C10M 137/02 | (2006.01) |

(52) U.S. Cl.
CPC .......... *F16C 33/6633* (2013.01); *C10M 169/00* (2013.01); *C10M 169/06* (2013.01);
(Continued)

(58) Field of Classification Search
CPC ...... F16C 19/54; F16C 33/102; F16C 33/103; F16C 33/6603; F16C 33/6607; F16C 33/6633; C10M 137/04; C10M 169/00; C10M 169/06

USPC .......... 508/441, 434, 442; 384/445, 462, 606
See application file for complete search history.

(56) References Cited

U.S. PATENT DOCUMENTS

| | | |
|---|---|---|
| 2,294,804 A | 9/1942 | Ricketts |
| 3,115,465 A | 12/1963 | Orloff |

(Continued)

FOREIGN PATENT DOCUMENTS

| | | |
|---|---|---|
| EP | 0244043 A2 | 11/1987 |
| JP | 62-275197 A | 11/1987 |

(Continued)

OTHER PUBLICATIONS

International Search Report Dated Dec. 6, 2011.

*Primary Examiner* — Pamela H Weiss
(74) *Attorney, Agent, or Firm* — Hedman & Costigan, P.C.; James V. Costigan; Kathleen A. Costigan

(57) ABSTRACT

The present invention provides a grease composition having an excellent fretting wear resistance in a wide temperature region from low to high temperatures and particularly even at low temperatures and a rolling bearing in which the grease composition is packed. A grease composition (7) is packed inside a grease-packed bearing (1). The grease composition (7) contains base oil, a thickener, and an additive. The additive contains at least, one kind selected from among a phosphite ester of formula (1) or a phosphite ester of formula (2):

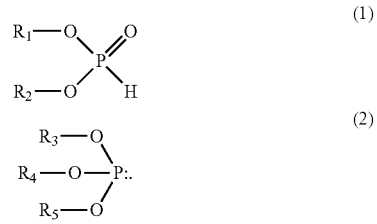

7 Claims, 6 Drawing Sheets

(52) U.S. Cl.
CPC .......... *F16C33/6607* (2013.01); *C10M 137/04* (2013.01); *C10M 137/02* (2013.01); C10M 2203/1006 (2013.01); C10M 2205/0285 (2013.01); C10M 2207/1256 (2013.01); C10M 2207/2805 (2013.01); C10M 2215/1026 (2013.01); C10M 2223/04 (2013.01); C10M 2223/049 (2013.01); C10N 2230/02 (2013.01); C10N 2230/06 (2013.01); C10N 2230/76 (2013.01); C10N 2240/02 (2013.01); C10N 2240/046 (2013.01); C10N 2250/10 (2013.01); F16C 2326/02 (2013.01); F16C 2360/31 (2013.01); C10M 2207/1236 (2013.01); C10M 2207/1285 (2013.01); C10N 2210/01 (2013.01); C10N 2220/022 (2013.01)

(56) References Cited

U.S. PATENT DOCUMENTS

| | | | |
|---|---|---|---|
| 4,410,435 A * | 10/1983 | Naka et al. ............... 508/440 |
| 4,802,999 A | 2/1989 | Koizumi et al. |
| 5,362,409 A * | 11/1994 | Wiggins et al. ............ 508/434 |
| 5,523,005 A * | 6/1996 | Di Biase et al. ........... 508/323 |
| 5,792,733 A * | 8/1998 | Minami et al. ............ 508/422 |
| 6,794,342 B2 | 9/2004 | Komiya et al. |
| 7,234,872 B2 * | 6/2007 | Fujita et al. ............... 384/462 |
| 2004/0252924 A1 * | 12/2004 | Kiuchi et al. ............. 384/492 |
| 2006/0069000 A1 * | 3/2006 | Dong et al. ............... 508/422 |
| 2007/0154128 A1 * | 7/2007 | Mikami ..................... 384/627 |
| 2007/0181357 A1 * | 8/2007 | Saito et al. ................ 180/65.5 |
| 2009/0008945 A1 * | 1/2009 | Helle et al. ................. 290/55 |
| 2009/0247441 A1 * | 10/2009 | Baum ........................ 508/552 |

FOREIGN PATENT DOCUMENTS

| | | |
|---|---|---|
| JP | 01-170691 A | 7/1989 |
| JP | 02-232297 B2 | 9/1990 |
| JP | 2002-265970 A | 9/2002 |
| JP | 2006-342260 A | 12/2006 |
| JP | 2009-019703 A | 1/2009 |
| JP | 2010-084142 A | 4/2010 |

* cited by examiner

GREASE COMPOSITION AND ROLLING BEARING

TECHNICAL FIELD

The present invention relates to a grease composition. More particularly, the present invention relates to a grease composition useful for preventing fretting wear (micromotion-caused wear) which occurs at sliding-contact portions and connected portions of parts aimed at restraining a relative motion and parts which have a slight reciprocating motion. The present invention also relates to a rolling bearing in which the grease composition is packed. The present invention particularly relates to a rolling bearing to be used for motors for industrial machines and electric equipments and motors for driving electric cars, and the like and a rolling bearing to be used by incorporating it in a wind power generator.

BACKGROUND ART

A wear phenomenon (hereinafter referred to as fretting) called a fretting wear occurs on various mechanical parts such as parts aimed at restraining a relative motion of a fit-in portion of a shaft, a bolted portion, a riveted portion, a tapered coupler, and the like; and parts such as a rolling bearing, a sliding bearing, a ball bush, a spline bearing, a flexible shaft coupling, a universal joint, a constant velocity joint, a laminated leaf spring, a coil spring, an electric contact point, a valve, a valve seat, a wire rope, and the like which have a slight reciprocating motion. In transporting cars a long distance by using a trailer, a freight train or the like, the fretting may occur on a rolling surface of the bearing owing to slight vibrations which occur during transport. In the case where a bearing is used in a low-temperature environment such as a cold region, lubricating oil cannot be sufficiently supplied to the rolling surface thereof. As a result, damage such as the fretting is liable to occur.

There is a possibility that the fretting occurs on motors to be used in environments in which parts of the motors have slight reciprocating motions and vibrations. In motors for industrial machines such as a servo motor, a stepping motor, and the like, there is a fear that the fretting occurs on the rolling surfaces of the bearings due to vibrations of parts thereof which occur when the motors are in operation and slight reciprocating motions of parts thereof. There is a fear that the fretting occurs on the rolling surfaces of the bearings of motors for electric equipments for use in cars and on the rolling surfaces of the bearings of motors for driving electric cars and hybrid cars owing to slight vibrations caused by an engine power and the like and owing to slight vibrations caused by circumstances of road surfaces while cars are traveling. In the case where lubricating oil is not sufficiently supplied to the rolling surfaces of the bearings in low-temperature environments, the fretting is liable to occur.

In conformity to a tendency that a motor is miniaturized in recent years, the miniaturization of a bearing for supporting the rotor of the motor is being advanced. Therefore there is tendency that a high contact surface pressure is applied to members constructing the bearing for the motor. Further there is a large increase in the rotational speed of the motor. Thus when the operation of the motor is started and stopped, there is tendency that the bearing for the motor has a high acceleration and deceleration in the rotation of the motor. Owing to an increase in a surface pressure at a portion between rolling elements and a bearing ring and an increase in sliding at the above-described portion caused by a sudden acceleration and a sudden deceleration in the rotation of the bearing for the motor, an oil film is liable to break (defective lubrication) at the above-described portion. Thereby metal contact occurs and thus the rolling element and the bearing ring are liable to wear, which increases the degree of fear of the occurrence of the fretting.

A rolling bearing and particularly a large double-row roller bearing as shown in FIG. 5 are frequently used as a bearing supporting a main shaft of a large wind power generator. A rotor blade 32 is mounted on a rotor shaft (main shaft) 33. The rotor shaft 33 is rotated by a wind power received thereby. The rotation of the rotor shaft 33 is increased by a speed-up gear 36 to rotate a power generator 37 and generate an electric power. While the electric power is being generated by the received wind power, an axial load (axial load applied to bearing) and a radial load (radial load applied to bearing) generated by a wind power applied to the rotor blade 32 are applied to the rotor shaft 33 supporting the rotor blade 32. A blade bearing for use in a blade pitch pivotal seat and a yaw bearing for use in a yaw pivotal seat are used for the wind power generator. To receive wind efficiently, the blade bearing is mounted on the base of a blade to rotatably support the blade so that the angle of the blade can be adjusted in dependence on the strength of the wind. The yaw bearing pivotally supports the yaw of a nacelle to adjust the direction of a main shaft according to the direction of wind.

Because the main shaft-supporting bearing, the blade bearing, and the yaw bearing are operated in environments where the direction and power of wind always fluctuate, the main shaft-supporting bearing, the blade bearing, and the yaw bearing are repeatedly oscillated in opposite directions in dependence on the direction of the wind and slowly and quickly by the strength of the wind. As a result, the fretting may occur on the rolling surface of the bearing. The main shaft-supporting bearing irregularly repeats start, acceleration, deceleration, stop with the main shaft-supporting bearing being always subjected to a load fluctuation. In addition, because vibrations of the blade and a gear box are applied to the main shaft-supporting bearing. Thus there is a high possibility that the fretting occurs on the main shaft-supporting bearing. In the wind power generator which is installed on the top of a mountain and in a very cold district and is thus subjected to very low temperatures, grease hardens and thus lubricating oil cannot be sufficiently supplied to the rolling surface of the bearing. Therefore there is a fear that the fretting has a large damage.

Various methods for preventing the occurrence of the fretting have been proposed. In one of these proposed methods, an appropriate lubricant is selected to prevent the occurrence of the fretting. In this method, at least one substance selected from among oxidized paraffin, diphenylhydrogen phosphite, and hexamethylphosphoric triamide is added to the urea-based thickener (see patent document 1).

In a hub bearing for rotatably supporting wheels of a car, carbon steel for machine structural use such as S53C which has a high forgeability and is inexpensive is used in a second generation hub bearing (GEN 2) and a third-generation hub bearing (GEN 3) provided with a flange on the outer ring thereof. In the hub bearing composed of the carbon steel for machine structural use, by subjecting the raceway part to high frequency heat treatment, the rolling fatigue strength of the bearing part is secured. But the carbon steel for machine structural use contains a small amount of the alloy component and thus has a weak surface strength. Therefore the carbon steel for machine structural use is inferior to bearing steel in a resistance to peeling of grease arising from the surface of the bearing part. As a measure for solving the above-described problem of the carbon steel for machine structural use, grease containing zinc dithiocarbamate added to its base oil as its essential component is known (see patent document 2).

As grease for preventing the fretting from occurring in the hub bearing or the like in a wide temperature range from low to high temperatures by using base oil comparatively inexpensive, the grease containing the predetermined base oil, the poly(meta)acrylate, zinc dithiophosphate, and the phosphate is proposed (see patent document 3).

PRIOR-ART TECHNICAL DOCUMENT

Patent Document

Patent document 1: U.S. Pat. No. 2,576,898
Patent document 2: Japanese Patent Application Laid-Open No. 2006-342260
Patent document 3: Japanese Patent Application Laid-Open No. 2010-84142

SUMMARY OF THE INVENTION

Problem to be Solved by the Invention

The grease of the patent document 1, however, does not have a sufficient performance in preventing the occurrence of the fretting at low temperatures. The grease of the patent document 2 is also insufficient in the resistance to the peeling thereof arising from the surface of a bearing. Thus in the case of the bearing and the like for which the grease of the patent document 2 is used, the fretting is liable to occur at low temperatures.

It is difficult for the grease of the patent document 1 to sufficiently prevent the occurrence of the fretting in the case where the grease of the patent document 1 is used for motors in which parts thereof are liable to have slight reciprocating motions and vibrations. It is also difficult for the grease of the patent document 1 to sufficiently prevent the occurrence of the fretting in the case where the grease is used for the rolling bearing which is used by incorporating it n the windpower generator where the direction and power of wind always fluctuate and which is repeatedly oscillated in opposite directions in dependence on the direction of the wind and slowly and quickly by the strength of the wind.

In the present situation, the effect of improving the fretting wear resistance to be achieved by the grease used for lubrication has not been sufficiently clarified. For example, there is a case in which grease containing the same thickener gives contradictory results in the fretting wear resistance in dependence on test methods. There are many reports that greases containing phosphorous compounds such as a phosphate or a phosphate ester as the additive thereof are preferable. But the fretting wear resistances of the greases are greatly different from one another according to the structures of the phosphorous compounds.

The present invention has been made to deal with the above-described problems. Therefore it is an object of the present invention to provide a grease composition having an excellent fretting wear resistance in a wide range from low to high temperatures and particularly even at low temperatures and a rolling bearing in which the grease composition is packed. It is another object of the present invention to provide a rolling bearing which has an excellent fretting wear resistance and is capable of preventing the rolling surface thereof from wearing in the case where the rolling bearing is used for a motor and a wind power generator.

Means for Solving the Problem

The grease composition of the present invention contains base oil, a thickener, and an additive. The additive contains at least one kind selected from among a phosphite ester shown by a chemical formula (1) or a phosphite ester shown by a chemical formula (2). The content of the phosphite ester is 0.5 to 4 parts by weight for 100 parts by weight which is a total of an amount of the base oil and that of the thickener.

[Chemical formula 1]

[Chemical formula 2]

(In the chemical formulas (1) and (2), $R_1$, $R_2$, $R_3$, $R_4$, and $R_5$ denote a methyl group or an ethyl group. $R_1$ and $R_2$ are the same group or different groups. $R_3$, $R_4$, and $R_5$ are the same group or different groups).

The grease composition contains neither phosphite esters other than the phosphite ester shown by the formula (1) or by the formula (2) nor phosphate esters having organic groups whose carbon number is not less than three.

The phosphite ester is dimethyl phosphite, diethyl phosphite, trimethyl phosphite or triethyl phosphite.

The thickener is a urea compound shown by a chemical formula (3):

[Chemical formula 3]

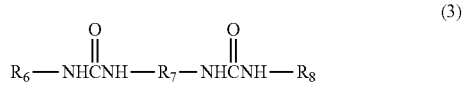

(In the chemical formula (3), $R_7$ denotes a divalent hydrocarbon group whose carbon number is 6 to 15. $R_6$ and $R_8$ denote monovalent hydrocarbon groups each containing an aromatic ring. $R_6$ and $R_8$ are the same group or different groups.)

The base oil is mineral oil and/or synthetic oil. The kinetic viscosity of the base oil at 40° C. is 20 to 150 mm²/s. The worked penetration of the grease composition is 200 to 350.

A rolling bearing of the first aspect of the present invention has an inner ring; an outer ring; and a plurality of rolling elements interposed between the inner ring and the outer ring. The grease composition of the present invention is packed inside the rolling bearing such that the grease composition is applied to circumferences of the rolling elements. The rolling bearing is used as a hub bearing.

A rolling bearing of the second aspect of the present invention supports a rotor of a motor. The rolling bearing has an inner ring; an outer ring; a plurality of rolling elements disposed between the inner ring and the outer ring; and a sealing member provided at openings disposed at both axial ends of the inner ring and the outer ring. The grease composition of the present invention is packed inside the rolling bearing such that the grease composition is applied to circumferences of the rolling elements.

A rolling bearing of the third aspect of the present invention is incorporated in a wind power generator. The rolling bearing has a plurality of rolling elements interposed between an inner ring and an outer ring such that the rolling elements are capable of rolling. The grease composition of the present invention is packed inside a space, formed between the inner ring and the outer ring, in which the rolling elements are disposed. In the third aspect, the base oil is synthetic oil. The kinetic viscosity of the base oil at 40° C. is 300 to 600 mm²/s.

Effect of the Invention

Because the grease composition of the present invention contains a predetermined amount of the phosphite ester shown by the chemical formula (1) or (2) as the additive, the grease composition is capable of preventing the occurrence of the fretting and thus has an excellent fretting wear resistance. In addition, because the predetermined diurea is used as the thickener of the grease composition, the grease composition is capable of preventing the occurrence of the fretting in a wide temperature region from low to high temperatures. Therefore the field of industry for which the grease composition is utilizable is very wide and thus it is possible to use the grease composition of the present invention for various equipments.

The above-described grease composition is packed inside the rolling bearing of the present invention, the rolling bearing is allowed to prevent the occurrence of the fretting in a wide temperature region from low to high temperatures. Therefore the rolling bearing can be used as a hub bearing for rotatably supporting wheels of a car.

Although the rolling bearing of the present invention is used in environments in which parts thereof have slight reciprocating motions and vibrations, the rolling bearing has an excellent fretting wear resistance and is thus allowed to prevent the fretting from occurring on the rolling surface thereof in a wide temperature region. Therefore the rolling bearing of the present invention can be preferably utilized to support rotors of motors for industrial machines and electric equipments and rotors of motors for driving electric cars.

Although the rolling bearing of the present invention is used in environments in which parts thereof are repeatingly oscillated, the rolling bearing has an excellent fretting wear resistance and is thus allowed to prevent the fretting from occurring on the rolling surface thereof in a wide temperature region. Therefore the rolling bearing of the present invention can be preferably utilized to support the main shaft, blade, and yaw of a wind power generator.

MODE FOR CARRYING OUT THE INVENTION

Figure 1:
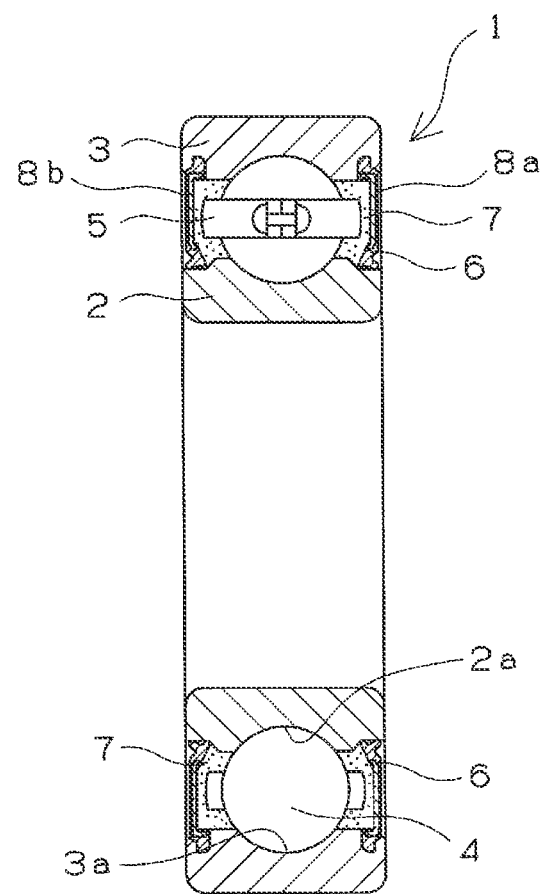
FIG. 1 is a sectional view showing a deep groove ball bearing as an example of a rolling bearing of the present invention.

Preferred embodiments of the present invention are described in detail below. The grease composition of the present invention contains base oil, a thickener, and an additive. The additive contains predetermined phosphite ester.

The predetermined phosphite ester to be used for the grease composition of the present invention is at least one kind selected from among phosphite ester shown by a chemical formula (1) or phosphite ester shown by a chemical formula (2). One of the phosphite esters shown by the formulas (1) and (2) may be used singly or in combination of not less than two kinds.

[Chemical formula 4]

(1)

[Chemical formula 5]

(2)

(In the chemical formulas (1) and (2), $R_1$, $R_2$, $R_3$, $R_4$, and $R_5$ denote a methyl group or an ethyl group. $R_1$ and $R_2$ are the same group or different groups. $R_3$, $R_4$, and $R_5$ are the same group or different groups).

The phosphite ester shown by the formula (1) or the formula (2) includes phosphite diester such as dimethyl phosphite, diethyl phosphite, and methyl ethyl phosphite; and phosphite triester such as trimethyl phosphite, triethyl phosphite, dimethyl ethyl phosphite, and methyl diethyl phosphite. Of these phosphite esters, the dimethyl phosphite, the diethyl phosphite, the trimethyl phosphite, and the triethyl phosphite are preferable.

In the grease composition of the present invention, the content of the phosphite ester for 100 parts by weight which is the total of the amount of the base oil and that of the thickener is 0.5 to 4 parts by weight. When the content of the phosphite ester is less than 0.5 parts by weight, there is a possibility that the fretting wear resistance of the grease composition cannot be improved. When the content of the phosphite ester is more than four parts by weight, it is difficult to improve the fretting wear resistance of the grease composition to a higher extent. In the case where not less than two kinds of the phosphite esters are used, the total of the amounts thereof is set to the above-described range as the content of the phosphite ester.

It is preferable that the grease composition of the present invention does not contain phosphite esters other than the phosphite ester shown by the formula (1) or shown by the formula (2). It is also preferable that the grease composition of the present invention does not contain phosphate esters having organic groups whose carbon number is not less than three. That is, it is also preferable that the grease composition of the present invention does not contain substances other than those obtained by oxidizing the phosphite ester shown by the formula (1) or shown by the formula (2). In the case where the grease composition of the present invention contains the above-described unpreferable phosphite esters or the phosphate esters, there is a fear that the grease composition is inferior in its fretting resistance. There is a fear that the grease composition is inferior in its fretting resistance at low temperatures.

By using the predetermined phosphite ester having a low molecular weight as the additive of the grease composition of the present invention, the grease composition is capable of preventing the occurrence of the fretting without using other phosphorous compounds such as zinc dithiophosphate, tricresyl phosphate, and the like and other extreme pressure agents which have been hitherto used to prevent the fretting from occurring and the grease from peeling from the surface of the bearing.

The grease composition of the present invention may contain known additives other than the above-described phosphite esters as necessary. As such additives, phenol-based and amine-based antioxidants; a rustproof agent consisting of carboxylates, sulfonates or the like; an abrasion-resistant agent consisting of polyalkylene glycol, glycerin or the like; the extreme pressure agent such as chlorinated paraffin, sulfurized oil, organic molybdenum compounds, and the like; an oiliness improver such as higher fatty acid, synthetic ester, and the like; and a solid lubricating agent such as graphite, molybdenum disulfide or the like are listed. These additives can be added to the base oil singly or in combination of not less than two kinds.

The base oil of the grease composition of the present invention is not limited to a specific one, but it is possible to use those normally used in the field of grease. For example, mineral oil, synthetic oil, and mixed oils thereof are listed.

As the mineral oil, those to be obtained by methods normally carried out in the process of producing lubricating oil in the petroleum refining industry are listed. More specifically, the mineral oil which is refined by performing not less than one of the following processings of a lubricating oil distillate obtained by distilling crude oil at a normal pressure and at a decreased pressure: The processings include solvent deasphalting, solvent extraction, hydrogenolysis, solvent dewaxing, catalytic dewaxing, hydrogenation refining, sulfuric acid cleaning, and clay treatment.

As the above-described synthetic oil, ester oil, polybutene, poly-α-olefin (hereinafter referred to as PAO oil) such as 1-octene oligomer, 1-decene oligomer, and the like or hydrides thereof; alkyl naphthalene; alkyl benzene; polyoxyalkylene glycol; polyphenyl ether; dialkyl diphenyl ether; silicone oil; fluorine oil; and GTL oil synthesized by Fischer-Tropsch process are listed.

In packing the grease composition in a rolling bearing for a motor, it is preferable to use at least one oil selected from among the ester oil and the PAO oil of these synthetic oils, because the ester oil and the PAO oil are excellent in the heat resistance and lubricating property thereof. It is especially preferable to essentially use the ester oil. It is preferable to use a mixed oil of the ester oil and the PAO oil as necessary. In using the mixed oil of the ester oil and the PAO oil, it is preferable to set the mixing ratio of the PAO oil to the ester oil (ratio by weight) to 8 to 2 to 2 to 8.

The ester oil is a compound which has an ester group in its molecule and is liquid at a room temperature. As the ester oil, polyol ester oil, phosphate ester oil, polymer ester oil, aromatic ester oil, carbonate ester oil, and diester oil are listed. Of these ester oils, the aromatic ester oil and the polyol ester oil are preferable.

The aromatic ester oil to be obtained by a reaction between an aromatic polybasic acid or a derivative thereof and a higher alcohol. As the aromatic polybasic acid, tricarboxylic acid such as trimellitic acid, biphenyl tricarboxylic acid, and naphthalene tricarboxylic acid; aromatic tetracarboxylic acid such as pyromellitic acid, biphenyl tetracarboxylic acid, benzophenone tetracarboxylic acid, and naphthalene tetracarboxylic acid; and derivatives such as acid anhydrides thereof are listed. As the higher alcohol, aliphatic monovalent alcohols whose carbon number is not less than four such as octyl alcohol, decyl alcohol, and the like are preferable. As examples of the aromatic ester oil, trioctyl trimellitate, tridecyl trimellitate, and tetraoctyl pyromellitate are listed.

As the polyol ester oil, compounds having a plurality of ester groups in the molecule to be obtained by the reaction between polyol and a monobasic acid are preferable. The monobasic acid to be reacted with the polyol may be used singly or as a mixture. Dibasic acids may be used in the case of oligoester. As the polyol, trimethylolpropane, pentaerythritol, dipentaerythritol, neopentyl glycol, 2-methyl-2-propyl-1, and 3-propanediol are listed. As the monobasic acid, monovalent aliphatic acids having carbon numbers 4 through 18 are listed. For example, valeric acid, caproic acid, caprilic acid, enanthic acid, pelargonic acid, capric acid, undecanoic acid, lauric acid, myristic acid, palmitic acid, stearic acid, caproleic acid, undecylenic acid, linderic acid, tsuzuic acid, physeteric acid, myristoleic acid, palmitoleic acid, petroselinic acid, oleic acid, elaidic acid, asclepinic acid, vaccenic acid, sorbic acid, linoleic acid, sabinic acid, and ricinoleic acid are listed. As the polyol ester oil, trimethylolpropane caprylate, trimethylolpropane pelargonate, pentaerythritol-2-ethylhexanoate, pentaerythritol pelargonate are listed.

As examples of the diester oil, ditridecyl glutarate, di-2-ethylhexyl adipate, di-isodecyl adipate, ditridecyl adipate, and di-3-ethylhexyl sebacate are listed.

In packing the grease composition in a rolling bearing for a wind power generator, the synthetic oil is mainly used as the base oil of the grease composition. Of the above-described synthetic oils, it is preferable to use the PAO oil because the PAO oil is excellent in its oxidation stability and the performance at low temperatures (rolling bearing is frequently used in cold places such as highland).

The kinetic viscosity of the base oil at 40° C. is preferably 20 to 150 mm$^2$/s. When the kinetic viscosity of the base oil at 40° C. is less than 20 mm$^2$/s, the viscosity is so low that an oil film is liable to break, and the oil vaporizes in a large amount. On the other hand, when the kinetic viscosity of the base oil at 40° C. is more than 150 mm$^2$/s, the performance of supplying the lubricating oil to a rolling surface of the rolling bearing at low temperatures is inferior and thus the fretting is liable to occur. In addition power loss becomes large. Thus in the case where the grease composition is used for the bearing, the torque thereof rises and the calorific value becomes high. In the case where the mixed oil is used as the base oil of the grease composition, it is preferable that the kinetic viscosity of the mixed oil falls within the above-described range.

In packing the grease composition in the rolling bearing for the motor, the kinetic viscosity of the base oil at 40° C. is favorably 20 to 50 mm$^2$/s, more favorably 20 to 40 mm$^2$/s, and most favorably 26 to 40 mm$^2$/s. When the kinetic viscosity of the base oil at 40° C. is more than 50 mm$^2$/s, the performance of supplying the lubricating oil to the rolling surface is inferior. Thus the fretting is liable to occur when the motor is used in environments in which parts thereof have slight reciprocating motions and vibrations. In addition because the torque of the rolling bearing rises, power loss becomes large when the motor is driven and the calorific value also becomes large.

In packing the grease composition in the rolling bearing for the wind power generator, the kinetic viscosity of the base oil at 40° C. is favorably 300 to 600 mm$^2$/s. The kinetic viscosity of the base oil at 40° C. is more favorably 350 to 550 mm$^2$/s and most favorably 400 to 500 mm$^2$/s. The wind power generator is so constructed that a main shaft on which a blade is mounted is rotated by a wind power. When the wind power is low, the main shaft rotates at a very low number of rotations.

Thus the oil film of the bearing supporting the main shaft becomes comparatively thin and thus unstable. Therefore when the kinetic viscosity of the base oil at 40° C. is less than 300 mm$^2$/s, there is a fear that the oil film is liable to break. On the other hand, when the kinetic viscosity of the base oil at 40° C. is more than 600 mm$^2$/s, the performance of supplying the lubricating oil to the rolling surface of the rolling bearing is inferior and thus the fretting is liable to occur. In addition the torque of the bearing rises and thus there is a fear that power generation efficiency deteriorates.

The thickener of the grease composition of the present invention is not limited to a specific one, but it is possible to use those normally used in the field of grease. For example, it is possible to use soap-based thickeners such as metal soap and complex metal soap; and non-soap-based thickeners such as Benton, silica gel, urea compounds, and urea.urethane compounds. As the metal soap, sodium soap, calcium soap, aluminum soap, and lithium soap are listed. As the urea compounds and the urea.urethane compounds, diurea compounds, triurea compounds, tetraurea compounds, other polyurea compounds, and diurethane compounds are listed. Of these thickeners, it is preferable to use the lithium soap (lithium complex soap is included) or the urea compound, because the lithium soap and the urea compound are excellent in the heat resistance thereof and in the performance of entering into and adhering to the rolling surface and thus easily capable of preventing the occurrence of the fretting. As the urea compound, a diurea compound shown by the following chemical formula (3) is preferable.

[Chemical formula 6]

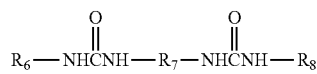

(3)

In the chemical formula (3), $R_6$ and $R_8$ denote monovalent hydrocarbon groups each containing an aromatic ring. $R_6$ and $R_8$ may be the same group or different groups. Because each of $R_6$ and $R_8$ consists of the monovalent hydrocarbon group containing the aromatic ring, the grease composition of the present invention containing the diurea compound is excellent in its heat resistance, durability, and fretting wear resistance. As such groups, listed are a phenyl group, a naphthyl group, an alkyl aryl group in which one or a plurality of hydrogen atoms of the phenyl group or the naphthyl group are substituted with one or a plurality of alkyl groups, and an aryl alkyl group in which one or a plurality of hydrogen atoms of the alkyl group is substituted with an aryl group such as the phenyl group or the naphthyl group.

Although the carbon number of an aromatic hydrocarbon group of $R_6$ and that of $R_8$ is not specifically limited respectively, the aromatic hydrocarbon group whose carbon number is 6 to 15 is preferably used. As the hydrocarbon group, whose carbon number is 6 to 15, containing the aromatic ring, a toluic group, a xyl group, a β-phencyl group, a t-butylphenyl group, a dodecylphenyl group, a benzyl group, and methylbenzyl group are listed.

In the chemical formula (3), $R_7$ denotes a divalent hydrocarbon group whose carbon number is 6 to 15. As such hydrocarbon group, a straight-chain or a branched chain alkylene group, a straight-chain or a branched chain alkenylene group, a cycloalkylene group, and an aromatic group are listed.

The urea compound is obtained by allowing isocyanate and monoamine to react with each other. To prevent a reactive free radical from being left, it is preferable to allow the isocyanate group of the isocyanate compound and the amino group of the amine compound to react with each other in almost an equivalent amount.

The diurea compound shown by the chemical formula (3) is obtained by a reaction between diisocyanate and monoamine. As the diisocyanate, phenylene diisocyanate, diphenyl diisocyanate, diphenylmethane diisocyanate, 1,5-naphtylene diisocyanate, 2,4-tolylene diisocyanate, 3,3-dimethyl-4,4-biphenylene diisocyanate, octadecane diisocyanate, decane diisocyanate, and hexane diisocyanate are listed. As the monoamine, aniline and p-toluidine are listed.

The polyurea compound is obtained by allowing the diisocyanate and the monoamine as well as the diamine to react with each other. The diisocyanate and the monoamine similar to those used to form the diurea compound are used. As the diamine, ethylenediamine, propanediamine, butanediamine, hexanediamine, octanediamine, phenylenediamine, tolylenediamine, xylenediamine, and diaminodiphenylmethane are listed.

In enclosing the grease composition in the rolling bearing for a motor, because the rolling bearing is demanded to have quietness and a low torque, of the urea compounds, it is preferable to use an aliphatic urea compound to be obtained by allowing the diisocyanate such as diphenylmethane diisocyanate and aliphatic monoamine such as octylamine to react with each other.

The base grease to which the above-described additive (phosphite ester) is to be added is obtained by adding the thickener such as the lithium soap or the urea compound to the base oil. The base grease containing the urea compound as its thickener is produced by allowing the polyisocyanate component and the monoamine components to react with each other in the base oil.

The content of the thickener which occupies in 100 parts by weight of the base grease is favorably 3 to 40 parts by weight and more favorably 5 to 30 parts by weight. The content of the thickener in this range is suitable for obtaining the intrinsic lubricating property of the grease composition. When the content of the thickener is less than three parts by weight, the thickener has a small thickening effect and thus it is difficult to form the grease composition. When the content of the thickener is more than 40 parts by weight, obtained base grease is so hard that it is difficult to obtain the desired effect.

It is preferable that the worked penetration (JIS K 2220) of the grease composition of the present invention is in the range of 200 to 350. When the worked penetration thereof is less than 200, the grease composition has a low degree of oil separation at low temperatures and a defective lubrication. Thereby the fretting is liable to occur. On the other hand, when the worked penetration of the grease composition is more than 350, obtained grease is soft and liable to flow outside the bearing, which is unpreferable.

The grease composition of the present invention is excellent for preventing the occurrence of the fretting wear (micromotion-caused wear). Therefore the grease composition is useful as grease for various mechanical parts such as parts aimed at restraining a relative motion of a fit-in portion of a shaft, a bolted portion, a riveted portion, a tapered coupler, and the like; and parts such as a rolling bearing, a sliding bearing, a ball bush, a spline bearing, a flexible shaft coupling, a universal joint, a constant velocity joint, a laminated leaf spring, a coil spring, an electric contact point, a valve, a valve seat, a wire rope, and the like which have a slight reciprocating motion.

FIG. 1 shows an example of the rolling bearing of the present invention. FIG. 1 is a sectional view of a deep groove ball bearing in which the grease composition is packed. In the deep groove ball bearing 1, an inner ring 2 having an inner ring rolling surface 2a on its peripheral surface and an outer ring 3 having an outer ring rolling surface 3a on its inner peripheral surface are concentrically disposed, and a plurality of rolling elements 4 is disposed between the inner ring rolling surface 2a and the outer ring rolling surface 3a. A cage 5 holds a plurality of the rolling elements 4. A sealing member 6 fixed to the outer ring 3 is provided at openings 8a and 8b disposed at both axial ends of the inner ring 2 and the outer ring 3. A grease composition 7 of the present invention is packed inside the deep groove ball bearing 1 such that the grease composition is applied to at least the circumferences of the rolling elements 4.

Figure 2:
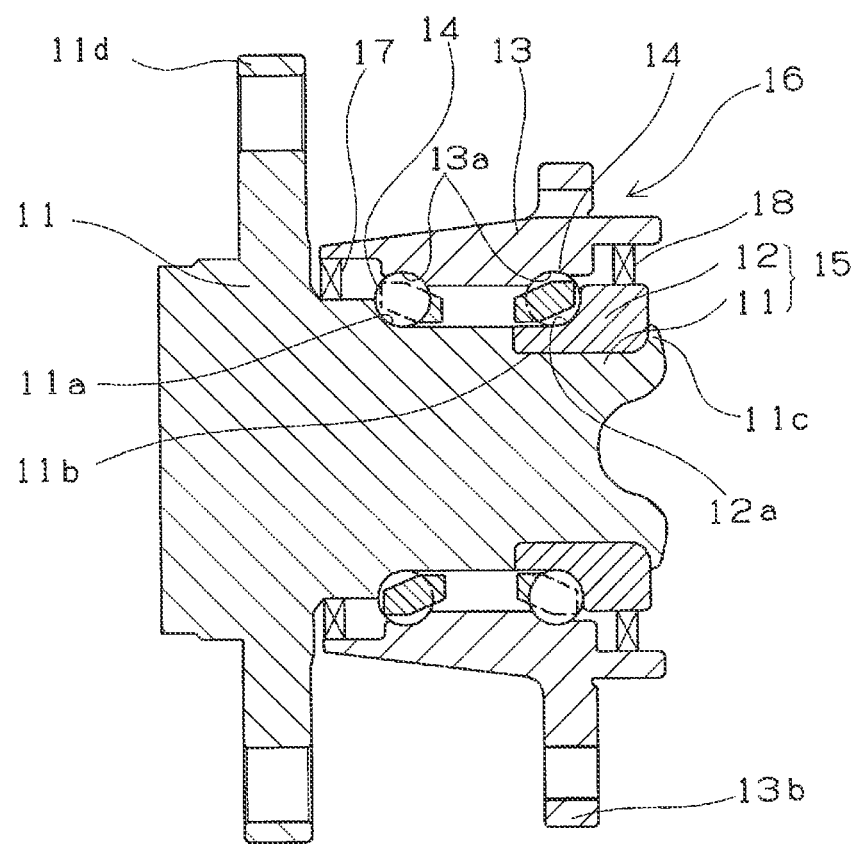
FIG. 2 is a sectional view showing a hub bearing as another example of the rolling bearing of the present invention.

FIG. 2 shows an example (third-generation hub bearing for use in driven wheel) in which the rolling bearing of the present invention is used as a hub bearing. FIG. 2 is a sectional view showing the hub bearing. A hub bearing 16 has an inner ring (called an inward member) 15 having a hub ring 11 and a driving inner ring 12 and an outer ring (called an outward member) 13, and double-row rolling elements 14, 14. The hub ring 11 has a wheel-mounting flange 11d, integral therewith at its one end, on which a wheel (not shown) is mounted. Formed on the outer periphery of the hub ring 11 are an inside rolling surface 11a and a small-diameter stepped portion 11b extended axially from the inside rolling surface 11a. In the present specification, "outside" in the axial direction means an outer side in the widthwise direction in a state where the hub bearing 16 is mounted on a car, whereas "inside" means a central side in the widthwise direction. The driving inner ring 12 having an inside rolling surface 12a formed on the outer periphery thereof is fitted in the small-diameter stepped portion 11b of the hub ring 11 by press fit. The removal of the inner ring 12 is prevented from being axially removed from the hub ring 11 by a caulking portion 11c formed by plastically deforming an end of the small-diameter stepped portion 11b of the hub ring 11 radially outward. The outer ring 13 has on its outer periphery a car body-mounting flange 13b on which the car body is mounted and which is integral with the outer ring 13 and has on its inner periphery the outside rolling surfaces 13a, 13a. The double-row rolling elements 14, 14 are accommodated between the outside rolling surfaces 13a, 13a and the inside rolling surfaces 11a, 12a opposed to the double-row outside rolling surfaces 13a, 13a such that the double-row rolling elements 14, 14 are capable of rolling. The grease of the present invention is packed in a space surrounded with a sealing member 17, the outer ring 13, a sealing member 18, the inner ring 15, and the hub ring 11 so that the grease covers the circumference of the double-row rolling elements 14, 14 sandwiched between the outer ring 13 and the inner ring 15 and lubricates a rolling contact portion between the rolling surfaces of the rolling elements 14, 14 and the inside rolling surfaces 11a, 12a as well as the outside rolling surfaces 13a, 13a. Because the grease composition of the present invention is packed in the hub bearing 16, the fretting can be prevented from occurring in a wide temperature region from low to high temperatures.

As materials that can be used for the above-described hub bearing, it is possible to list bearing steel, carburized steel, and carbon steel for machine structural use. Of these materials, it is preferable to use the carbon steel for machine structural use such as S53C which has high forgeability and is inexpensive. The carbon steel for machine structural use is used after the rolling fatigue strength of a bearing portion is secured by heat-treating it with a high-frequency wave.

Figure 3:
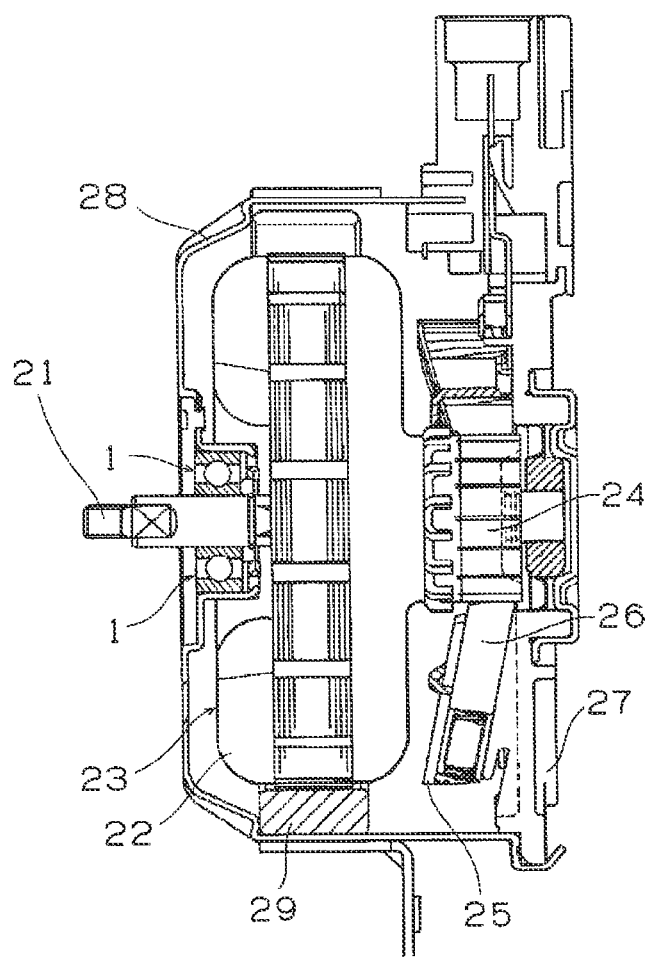
FIG. 3 is a sectional view of a motor in which the rolling bearing of the present invention is used.

FIG. 3 shows an example of a motor for which the rolling bearing of the present invention is used. FIG. 3 is a sectional view of the construction of the motor. The motor has a stator 29 consisting of a magnet, for the motor, disposed on an inner peripheral wall of a jacket 28, a rotor 23 around which a winding 22 fixed to a rotating shaft 21 is wound, a commutator 24 fixed to the rotating shaft 21, a brush holder 25 disposed on an end frame 27 supported by the jacket 28, and a brush 26 accommodated inside the brush holder 25. The rotating shaft 21 is rotatably supported on the jacket 28 by the deep groove ball bearing 1 (see FIG. 1) of the present invention and a supporting construction for the bearing 1. Because the grease composition of the present invention is packed inside the bearing 1, the bearing 1 has an excellent fretting wear resistance, although it is used in environments in which parts thereof have slight reciprocating motions and vibrations. Therefore the bearing 1 is capable of preventing the fretting from occurring on the rolling surface thereof in a wide temperature region.

As the rolling bearing for the motor, in addition to the deep groove ball bearing shown in FIG. 1, it is possible to use an angular ball bearing, a cylindrical roller bearing, a tapered roller bearing, a self-aligning roller bearing, a needle-shaped roller bearing, a thrust cylindrical roller bearing, a thrust tapered roller bearing, a thrust needle-shaped roller bearing, and a thrust self-aligning roller bearing. Of these rolling bearings, it is preferable to use the deep groove ball bearing having preferable rotation accuracy at a high-speed rotation, a high load resistance, and a low cost.

As motors to which the rolling bearing of the present invention is applicable, motors for industrial machines such as a motor for a ventilation fan, a blower motor for a fuel battery, a cleaner motor, a fan motor, a servo motor, a stepping motor; motors for electric equipments such as a starter motor of a car, an electromotive power steering motor, a steering-adjusting tilt motor, a blower motor, a wiper motor, and a power window motor; and motors for driving electric cars, hybrid cars, and the like. The rolling bearing of the present invention is applicable to other motors to be used in environments in which parts thereof have slight reciprocating motions and vibrations.

Figure 4:
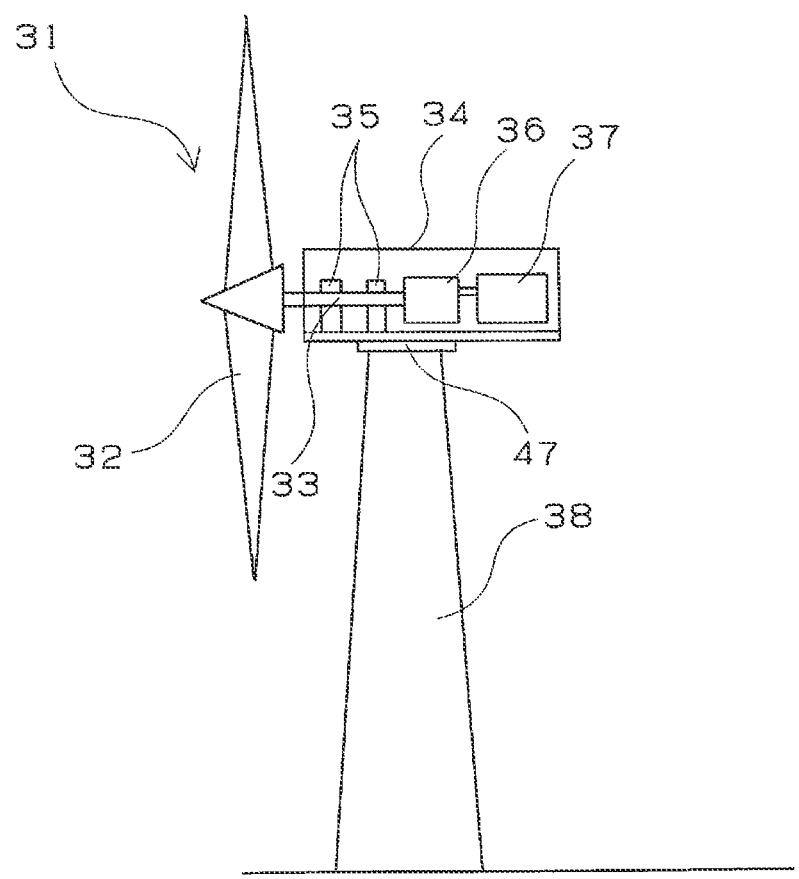
FIG. 4 is a schematic view of an entire wind power generator in which the rolling bearing of the present invention is used.
Figure 5:
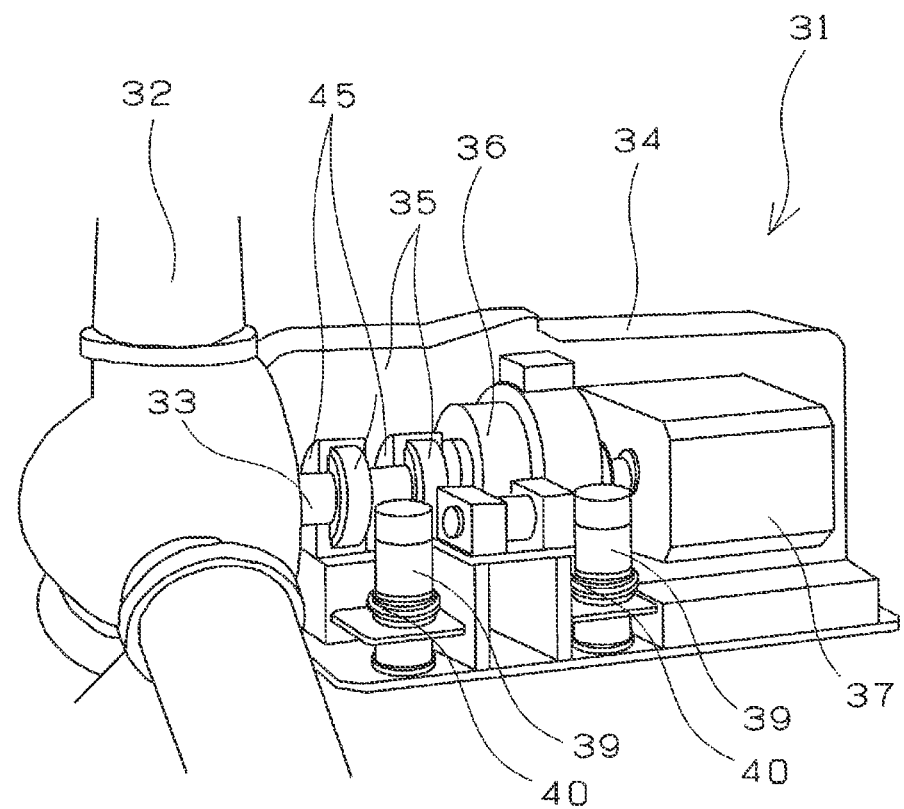
FIG. 5 shows details of the construction of a main shaft-supporting portion shown in FIG. 4.

A wind power generator using the rolling bearing of the present invention is described with reference to FIGS. 4 and 5. FIG. 4 is an illustration of the entire wind power generator. FIG. 5 shows the details of a portion supporting a main shaft shown in FIG. 4. As shown in FIG. 4, a wind power generator 31 has a rotor blade 32, a generator 37 to be driven through a speed-up gear 36 mounted on a rotor shaft (main shaft) 33 of the rotor blade 32, the speed-up gear 36, and a tower 38 holding a nacelle 34 accommodating the generator 37 at a predetermined level. The generator 37 is driven by the rotation of the rotor blade 32. A power generated by the generator 37 is taken out as an electric energy. As shown in FIG. 5, the rotor shaft 33 on which the rotor blade 32 is mounted is rotatably supported by a bearing 35 mounted in a bearing housing 45 disposed inside the nacelle 34. The bearing 35 is the rolling bearing of the present invention. Two bearings 35 are provided in the example shown in FIG. 5, but one bearing 35 may be provided.

The speed-up gear 36 increases the rotational speed of the rotor shaft 33 and transmits an increased rotational speed to an input shaft of the generator 37. The nacelle 34 is pivotally mounted on the tower 38 through a yaw pivotal seat bearing 47 and pivoted by a motor 39 of FIG. 5 for pivotal use through a reducer 40. The nacelle 34 is pivoted to adjust the direction of the rotor blade 32. The rolling bearing (not shown in the drawings) is mounted on a blade pitch pivotal seat disposed at a base of the rotor blade 32.

Figure 6:
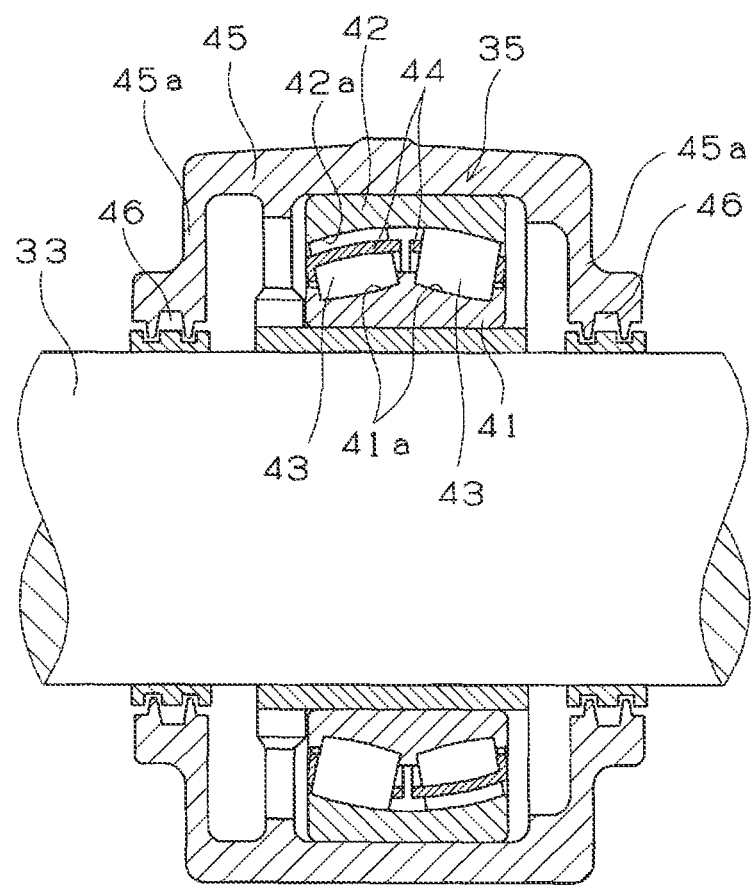
FIG. 6 is a sectional view showing a rolling bearing for supporting the main shaft of the wind power generator.

The main shaft-supporting bearing 35 is described below with reference to FIG. 6. FIG. 6 is a sectional view showing the main shaft-supporting bearing which is one example of the rolling bearing of the present invention. The bearing 35 is a double-row self-aligning roller bearing. The bearing 35 has an inner ring 41 and an outer ring 42 both of which make a pair of bearing rings and a plurality of rolling elements 43 interposed between the inner ring 41 and the outer ring 42. A raceway 42a of the outer ring 42 of the bearing 35 is spherical. The outer peripheral surface of each rolling element 43 is formed as a roller spherical along the raceway 42a. The inner ring 41 has a flanged construction having raceway 41a, 41a of respective rows separately. The rolling elements 43 of the respective rows are held by cages 44 respectively. The outer ring 42 is mounted on the bearing housing 45 by fitting the outer ring 42 on the inside-diameter surface thereof. The inner ring 41 is fitted on the outer periphery of the rotor shaft 33 and supports the rotor shaft 33. The bearing housing 45 has a seal 46 such as a labyrinth seal between a side wall portion 45a covering both ends of the bearing 35 and the rotor shaft 33. Because the bearing housing 45 provides a sealing property, a construction not having a seal is used for the bearing 35. The grease composition of the present invention is packed inside a space, formed between the inner ring 41 and the outer ring 42, in which the rolling elements 43 are disposed. Because the grease composition of the present invention is packed inside the bearing 35, the bearing 35 is allowed to have an excellent fretting wear resistance, although the bearing 35 is used in environments in which parts thereof are repeatingly oscillated and is thus capable of preventing the fretting from occurring on the rolling surface thereof in a wide temperature region.

As the rolling bearing for the wind power generator, in addition to the rolling bearing shown in FIG. 6, it is possible to use the deep groove ball bearing shown in FIG. 1, the angular ball bearing, the cylindrical roller bearing, the tapered roller bearing, the needle-shaped roller bearing, the thrust cylindrical roller bearing, the thrust tapered roller bearing, the thrust needle-shaped roller bearing, and the thrust self-aligning roller bearing.

As the main shaft-supporting bearing 35, it is possible to use radial bearings to which a thrust load can be applied. In addition to the self-aligning roller bearing shown in FIG. 6, of the above-described rolling bearings, it is possible to use the angular ball bearing, the tapered roller bearing, and the deep groove ball bearing as the main shaft-supporting bearing 35. Of these rolling bearings, as the main shaft-supporting bearing of the wind power generator which is operated in a state in which the main shaft is subjected to a wide range of a load from a light load to a heavy load which is applied thereto when a gust of wind blows and in which the direction of wind always change, the self-aligning roller bearing capable of absorbing the operation-caused flexure of the main shaft is especially preferable. As a blade bearing and a yaw bearing, the deep groove ball bearing and the angular ball bearing are preferable.

EXAMPLES

Although the present invention is described more specifically below by way of examples and comparative examples, the present invention is not restricted thereby.

Examples A-1 Through A-6 and Comparative Examples A-1 Through A-6

As shown in table 1, base grease was prepared by using aromatic urea as its thickener and mineral oil (TURBINE OIL 68 produced by JX Nippon Oil & Energy Corporation) as its base oil. P-toluidine (produced by Wako Pure Chemical Industries, Ltd.) and MDI (MILLIONATE MT (main component: diphenylmethane diisocyanate) produced by Nippon Polyurethane Industry Co., Ltd.) were used as the material of the thickener. The method of preparing the base grease (200 g scale (amount of thickener: 18 wt %)) was carried out as shown below.

(1) After 16.8 g of the p-toluidine and 119.4 g of the MDI were weighed and put in separate beakers, 82 g of the TURBINE OIL 68 serving as the base oil was added to the p-toluidine and the MDI. (2) Each mixture was heated up to about 80° C. by using a mantle heater to dissolve the p-toluidine and the MDI in the base oil respectively. (3) The base oil in which the p-toluidine was dissolved was added to the base oil in which the MDI was dissolved with the base oil being stirred to form grease. At this time, the temperature was set to 100 to 120° C. (4) By using an infrared spectroscopy (IR), the band of isocyanate (N=C=O) in the neighborhood of 2280 $cm^{-1}$ was checked. (5) The mixture was put in a constant-temperature bath having a temperature of 130° C. for two hours (stirred every 30 minutes) to promote a reaction between the p-toluidine and the MDI. Based on the band of the isocyanate (N=C=O) in the neighborhood of 2280 $cm^{-1}$, whether the reaction proceeded was checked. The mixture was naturally cooled overnight at a room temperature. (6) The mixture was applied to a triple roll to obtain the base grease.

After an additive was added to 100 parts by weight of each of the base greases prepared in the above-described manner at a mixing ratio shown in table 1, each of the mixtures was sufficiently stirred by a stirring/defoaming machine to obtain a specimen grease of each of the examples and the comparative examples. A low-temperature fretting test shown below was conducted on the obtained specimen greases to measure the wear amount of each of the specimen greases. Table 1 shows the results.

<Low-Temperature Fretting Test>

In conformity to ASTM D4170, a performance evaluation test was conducted by using a Fafnir fretting wear testing machine. Using 51204J as a bearing, the test was conducted for eight hours in conditions where the maximum contact surface pressure was 2.0 GPa, the oscillation cycle was 30 Hz, the oscillation angle was 12°, and the atmosphere temperature was −20°. The performance of each of the specimen greases was evaluated on the basis of the wear amount (mg) per bearing.

TABLE 1

| | Example | | | | | |
|---|---|---|---|---|---|---|
| | A-1 | A-2 | A-3 | A-4 | A-5 | A-6 |
| Base grease | | | | | | |
| Base oil | Mineral oil | Mineral oil | Mineral oil | Mineral oil | Mineral oil | Mineral oil |
| Thickener | Aromatic urea | Aromatic urea | Aromatic urea | Aromatic urea | Aromatic urea | Aromatic urea |
| Additive (part by weight[1]) | | | | | | |
| Phosphite ester | | | | | | |
| Dimethyl phosphite | 2 | — | — | — | 0.5 | 4 |
| Diethyl phosphite | — | 2 | — | — | — | — |
| Trimethyl phosphite | — | — | 2 | — | — | — |
| Triethyl phosphite | — | — | — | 2 | — | — |
| Phosphate ester | | | | | | |
| Tributyl phosphate | — | — | — | — | — | — |
| Triphenyl phosphate | — | — | — | — | — | — |
| TCP (tricresyl phosphate) | — | — | — | — | — | — |
| Kinetic viscosity of base oil (40° C. mm$^2$/s) | 68 | 68 | 68 | 68 | 68 | 68 |
| Worked penetration (JIS K2220) | 280 | 260 | 260 | 280 | 260 | 260 |
| Low-temperature fretting test, mg | 1 | 3 | 3 | 3 | 1 | 3 |

| | Comparative example | | | | | |
|---|---|---|---|---|---|---|
| | A-1 | A-2 | A-3 | A-4 | A-5 | A-6 |
| Base grease | | | | | | |
| Base oil | Mineral oil | Mineral oil | Mineral oil | Mineral oil | Mineral oil | Mineral oil |
| Thickener | Aromatic urea | Aromatic urea | Aromatic urea | Aromatic urea | Aromatic urea | Aromatic urea |
| Additive (part by weight[1]) | | | | | | |
| Phosphite ester | | | | | | |
| Dimethyl phosphite | — | — | — | — | — | — |
| Diethyl phosphite | — | — | — | — | — | — |
| Trimethyl phosphite | — | — | — | — | — | — |
| Triethyl phosphite | — | — | — | — | — | — |
| Phosphate ester | | | | | | |
| Tributyl phosphate | — | 2 | — | — | — | — |
| Triphenyl phosphate | — | — | 2 | — | — | — |
| TCP (tricresyl phosphate) | — | — | — | 2 | 1 | 4 |
| Kinetic viscosity of base oil (40° C. mm$^2$/s) | 68 | 68 | 68 | 68 | 68 | 68 |
| Worked penetration (JIS K2220) | 280 | 280 | 300 | 280 | 280 | 280 |
| Low-temperature fretting test, mg | 11 | 12 | 7 | 5 | 5 | 6 |

[1]Part by weight for 100 parts by weight of base grease

As shown in the specimen grease of the comparative example A-1 in which the additive was not added to the base grease, the specimen grease was inferior in the fretting wear resistance thereof at low temperatures. As shown in the specimen grease of each of the comparative examples A-2 through A-4 in which the additive other than the phosphite ester used in the present invention was added to the base grease, each of the specimen greases was inferior in the fretting wear resistance thereof at low temperatures. As shown in each of the specimen grease of each of the comparative examples A-5 and A-6 in which the additive other than the phosphite ester used in the present invention was added to the base grease in a smaller amount and in a larger amount respectively, each of the specimen greases was inferior in the fretting wear resistance thereof at low temperatures. On the other hand, the specimen grease of each of the examples A-1 through A-6 was excellent in the fretting wear resistance thereof at low temperatures.

Examples B-1 Through B-12 and Comparative Examples B-1 Through B-4

The specimen grease of each of the examples and the comparative examples was prepared to use them for a bearing of a motor. As shown in tables 2 through 4, the base grease of each of the specimen greases of the examples and the comparative examples was prepared by selecting a thickener and base oil. Regarding the composition of each of the base greases, the total of the amount of the thickener and that of the base oil was 100 parts by weight. "Lithium soap", shown in the tables, which is the thickener was 12-lithium hydroxystearate. Each grease containing "aliphatic urea" as its thickener was obtained by dissolving the MDI (MILLIONATE MT (main component: diphenylmethane diisocyanate) produced by Nippon Polyurethane Industry Co., Ltd.) in the half amount of the base oil shown in each table and octylamine whose equivalent amount was twice as large as that of the MDI in the remaining half of the base oil and mixing these substances with each other with these substances being stirred.

"Ester oil" of each of the examples B-1 through B-6 and the comparative examples B-1 and B-2 shown in the tables was mixed oil obtained by mixing an ester oil 1 (HATCOL H3110 produced by Nippon Steel Chemical Co., kinetic viscosity at 40° C.: 12 mm$^2$/s (diester oil)) and an ester oil 2 (ADEKALUBE 60ZO1A produced by ADEKA CORPORATION, kinetic viscosity at 40° C.: 32 mm$^2$/s (polyol ester oil)) with each other by setting a ratio (ratio by weight) between the ester oil 1 and the ester oil 2 to 3:7.

"PAO oil" of each of the examples B-7 through B-12 and the comparative examples B-3 and B-4 shown in the tables was SYNFLUID 601 (kinetic viscosity at 40° C.: 30 mm$^2$/s) produced by Nippon Steel Chemical Co. "Ester oil" of each of the examples B-7 through B-12 and the comparative examples B-3 and B-4 was HATCOL 2362 (kinetic viscosity at 40° C.: 72 mm$^2$/s (polyol ester oil)) produced by Nippon Steel Chemical Co. Base oil of each of the examples B-7 through B-12 and the comparative examples B-3 and B-4 was mixed oil obtained by mixing the ester oil and the PAO with each other by setting a ratio (ratio by weight) between the ester oil 1 and the PAO to 1:3.

After an additive was added to 100 parts by weight of each of the base greases prepared in the above-described manner at a mixing ratio shown in tables 2 through 4 respectively, each of the mixtures was sufficiently stirred by the stirring/defoaming machine to obtain a specimen grease of each of the examples and the comparative examples. 1) and 2) shown in each of tables 3 and 4 are the same as 1) and 2) shown at the bottom of table 2. A fretting test shown below was conducted on the obtained specimen greases to measure the wear amount of each of the specimen greases. Tables 2 through 4 show the results.

<Fretting Test>

In conformity to ASTM D4170, a performance evaluation test was conducted by using the Fafnir fretting wear testing machine. Using 51204J as a bearing, the test was conducted for two hours in conditions where the maximum contact surface pressure was 1.7 GPa, the oscillation cycle was 30 Hz, the oscillation angle was 12°, and the atmosphere room temperature was 20° C. The performance of each of the specimen greases was evaluated on the basis of the wear amount (mg) per bearing.

TABLE 2

|  | Example | | | | | |
| --- | --- | --- | --- | --- | --- | --- |
|  | B-1 | B-2 | B-3 | B-4 | B-5 | B-6 |
| Base grease | | | | | | |
| Base oil | Ester oil | Ester oil | Ester oil | Ester oil | Ester oil | Ester oil |
| Thickener | Lithium soap | Lithium soap | Lithium soap | Lithium soap | Lithium soap | Lithium soap |
| Amount of thickener (part by weight [1]) | 11 | 11 | 11 | 11 | 11 | 11 |
| Additive (part by weight[2]) | | | | | | |
| Dimethyl phosphite | 2 | — | — | — | 0.5 | 4 |
| Diethyl phosphite | — | 2 | — | — | — | — |
| Trimethyl phosphite | — | — | 2 | — | — | — |
| Triethyl phosphite | — | — | — | 2 | — | — |
| TCP (tricresyl phosphate) | — | — | — | — | — | — |
| Kinetic viscosity of base oil (40° C. mm$^2$/s) | 26 | 26 | 26 | 26 | 26 | 26 |
| Worked penetration (JIS K2220) | 244 | 244 | 244 | 244 | 244 | 244 |
| Fretting test, mg | 2 | 2 | 2 | 2 | 2 | 2 |

[1] Content (part by weight) of thickener which occupies in 100 parts by weight of base grease (base oil + thickener)
[2] Part by weight for 100 parts by weight of base grease

TABLE 3

|  | Example | | | | | |
| --- | --- | --- | --- | --- | --- | --- |
|  | B-7 | B-8 | B-9 | B-10 | B-11 | B-12 |
| Base grease | | | | | | |
| Base oil | PAO oil + ester oil | PAO oil + ester oil | PAO oil + ester oil | PAO oil + ester oil | PAO oil + ester oil | PAO oil + ester oil |
| Thickener | Aliphatic urea | Aliphatic urea | Aliphatic urea | Aliphatic urea | Aliphatic urea | Aliphatic urea |
| Amount of thickener (part by weight [1]) | 12 | 12 | 12 | 12 | 12 | 12 |
| Additive (part by weight[2]) | | | | | | |
| Dimethyl phosphite | 2 | — | — | — | 0.5 | 4 |
| Diethyl phosphite | — | 2 | — | — | — | — |
| Trimethyl phosphite | — | — | 2 | — | — | — |
| Triethyl phosphite | — | — | — | 2 | — | — |
| TCP (tricresyl phosphate) | — | — | — | — | — | — |

TABLE 3-continued

| | Example | | | | | |
|---|---|---|---|---|---|---|
| | B-7 | B-8 | B-9 | B-10 | B-11 | B-12 |
| Kinetic viscosity of base oil (40° C. mm²/s) | 40 | 40 | 40 | 40 | 40 | 40 |
| Worked penetration (JIS K2220) | 243 | 243 | 243 | 243 | 243 | 243 |
| Fretting test, mg | 3 | 3 | 3 | 3 | 3 | 3 |

[1] Content (part by weight) of thickener which occupies in 100 parts by weight of base grease (base oil + thickener)
[2] Part by weight for 100 parts by weight of base grease

TABLE 4

| | Comparative example | | | |
|---|---|---|---|---|
| | B-1 | B-2 | B-3 | B-4 |
| Base grease | | | | |
| Base oil | Ester oil | Ester oil | PAO oil + ester oil | PAO oil + ester oil |
| Thickener | Lithium soap | Lithium soap | Aliphatic urea | Aliphatic urea |
| Amount of thickener (part by weight [1]) | 11 | 11 | 12 | 12 |
| Additive (part by weight [2]) | | | | |
| Dimethyl phosphite | — | — | — | — |
| Diethyl phosphite | — | — | — | — |
| Trimethyl phosphite | — | — | — | — |
| Triethyl phosphite | — | — | — | — |
| TCP (tricresyl phosphate) | — | 2 | — | 2 |
| Kinetic viscosity of base oil (40° C., mm²/s) | 26 | 26 | 40 | 40 |
| Worked penetration (JIS K2220) | 244 | 244 | 243 | 243 |
| Fretting test, mg | 4 | 4 | 5 | 5 |

[1] Content (part by weight) of thickener which occupies in 100 parts by weight of base grease (base oil + thickener)
[2] Part by weight for 100 parts by weight of base grease As shown in the specimen greases of the comparative examples B-1 and B-3 in which no additive was added to the base grease, the specimen greases were inferior in the fretting wear resistance thereof. As shown in the specimen grease of each of the comparative examples B-2 and B-4 in which the additive (TCP) other than the phosphite ester used in the present invention was added to the base grease, the specimen greases had the same effect as that of the specimen greases in which the TCP was not added to the base grease. Thus the fretting wear resistance of these specimen greases could not be improved. On the other hand, the specimen grease of each of the examples B-1 through B-12 was excellent in the fretting wear resistance thereof.

Examples C-1 Through C-12 and Comparative Examples C-1 Through C-4

The base grease of each of the examples and the comparative examples was prepared to use them for a bearing of a wind power generator. As shown in tables 5 through 7, the base grease of each of the examples and the comparative examples was prepared by selecting a thickener and base oil. Regarding the composition of each of the base greases, the total of the amount of the thickener and that of the base oil was 100 parts by weight. "Synthetic oil", shown in the tables 5 through 7, which is the base oil was Mobilgear SHC XMP460 (trade name) produced by Exxon Mobil Corporation.

"Lithium complex" (lithium complex soap) which is a thickener was obtained by adding lithium hydroxystearate to the base oil, saponifying a predetermined amount of the lithium hydroxystearate at a rate of one mole of lithium hydroxide monohydrate for one mole of the hydroxystearic acid, adding azelaic acid to the solution and saponifying the azelaic acid at a rate of one mole of the lithium hydroxide monohydrate for one mole of the azelaic acid, heating the solution up to 200° C., cooling the solution, and mixing the above-described components with each other by using a triple roll mill.

"Urea" which is the thickener was obtained by dissolving the MDI (MILLIONATE MT (main component: diphenylmethane diisocyanate) produced by Nippon Polyurethane Industry Co., Ltd.) in the half amount of the base oil and the p-toluidine whose equivalent amount was twice as large as that of the MDI in the remaining half of the base oil and mixing these substances with each other with these substances being stirred.

After an additive was added to 100 parts by weight of each of the base greases prepared in the above-described manner at a mixing ratio shown in tables 5 through 7 respectively, each of the mixtures was sufficiently stirred by the stirring/defoaming machine to obtain a specimen grease of each of the examples and the comparative examples. 1) and 2) shown in each of tables 6 and 7 are the same as 1) and 2) shown at the bottom of table 5. A fretting test shown below was conducted on the obtained specimen greases to measure the wear amount of each of the specimen greases. Tables 5 through 7 show the results.

<Fretting Test>

In conformity to ASTM D4170, a performance evaluation test was conducted by using the Fafnir fretting wear testing machine. Using 51204J as a bearing, the test was conducted for two hours in conditions where the maximum contact surface pressure was 1.7 GPa, the oscillation cycle was 30 Hz, the oscillation angle was 12°, and the atmosphere room temperature was 25° C. The performance of each of the specimen greases was evaluated on the basis of the wear amount (mg) per bearing.

TABLE 5

| | Example | | | | | |
|---|---|---|---|---|---|---|
| | C-1 | C-2 | C-3 | C-4 | C-5 | C-6 |
| Base grease | | | | | | |
| Base oil | Synthetic oil | Synthetic oil | Synthetic oil | Synthetic oil | Synthetic oil | Synthetic oil |
| Thickener | Lithium complex | Lithium complex | Lithium complex | Lithium complex | Lithium complex | Lithium complex |
| Amount of thickener (part by weight [1]) | 17 | 17 | 17 | 17 | 17 | 17 |
| Additive (part by weight[2]) | | | | | | |
| Dimethyl phosphite | 2 | — | — | — | 0.5 | 4 |
| Diethyl phosphite | — | 2 | — | — | — | — |
| Trimethyl phosphite | — | — | 2 | — | — | — |
| Triethyl phosphite | — | — | — | 2 | — | — |
| TCP (tricresyl phosphate) | — | — | — | — | — | — |
| Kinetic viscosity of base oil (40° C. mm$^2$/s) | 460 | 460 | 460 | 460 | 460 | 460 |
| Worked penetration (JIS K2220) | 300 | 300 | 300 | 300 | 300 | 300 |
| Fretting test, mg | 3 | 3 | 3 | 3 | 5 | 5 |

[1] Content (part by weight) of thickener which occupies in 100 parts by weight of base grease (base oil + thickener)
[2] Part by weight for 100 parts by weight of base grease

TABLE 6

| | Example | | | | | |
|---|---|---|---|---|---|---|
| | C-7 | C-8 | C-9 | C-10 | C-11 | C-12 |
| Base grease | | | | | | |
| Base oil | Synthetic oil | Synthetic oil | Synthetic oil | Synthetic oil | Synthetic oil | Synthetic oil |
| Thickener | Urea | Urea | Urea | Urea | Urea | Urea |
| Amount of thickener (part by weight [1]) | 11 | 11 | 11 | 11 | 11 | 11 |
| Additive (part by weight[2]) | | | | | | |
| Dimethyl phosphite | 2 | — | — | — | 0.5 | 4 |
| Diethyl phosphite | — | 2 | — | — | — | — |
| Trimethyl phosphite | — | — | 2 | — | — | — |
| Triethyl phosphite | — | — | — | 2 | — | — |
| TCP (tricresyl phosphate) | — | — | — | — | — | — |
| Kinetic viscosity of base oil (40° C. mm$^2$/s) | 460 | 460 | 460 | 460 | 460 | 460 |
| Worked penetration (JIS K2220) | 300 | 300 | 300 | 300 | 300 | 300 |
| Fretting test, mg | 3 | 3 | 3 | 3 | 5 | 5 |

[1] Content (part by weight) of thickener which occupies in 100 parts by weight of base grease (base oil + thickener)
[2] Part by weight for 100 parts by weight of base grease

TABLE 7

| | Comparative example | | | |
|---|---|---|---|---|
| | C-1 | C-2 | C-3 | C-4 |
| Base grease | | | | |
| Base oil | Synthetic oil | Synthetic oil | Synthetic oil | Synthetic oil |
| Thickener | Lithium complex | Lithium complex | Urea | Urea |
| Amount of thickener (part by weight [1]) | 17 | 17 | 11 | 11 |
| Additive (part by weight[2]) | | | | |
| Dimethyl phosphite | — | — | — | — |
| Diethyl phosphite | — | — | — | — |
| Trimethyl phosphite | — | — | — | — |
| Triethyl phosphite | — | — | — | — |
| TCP (tricresyl phosphate) | — | 2 | — | 2 |
| Kinetic viscosity of base oil (40° C., mm$^2$/s) | 460 | 460 | 460 | 460 |
| Worked penetration (JIS K2220) | 300 | 300 | 300 | 300 |
| Fretting test, mg | 23 | 20 | 20 | 19 |

[1] Content (part by weight) of thickener which occupies in 100 parts by weight of base grease (base oil + thickener)
[2] Part by weight for 100 parts by weight of base grease As shown in the specimen greases of the comparative examples C-1 and C-3 in which no additive was added to the base grease, the specimen greases were inferior in the fretting wear resistance thereof. As shown in the specimen grease of each of the comparative examples C-2 and C-4 in which the additive (TCP) other than the phosphite ester used in the present invention was added to the base grease, the specimen greases had the same effect as that of the specimen greases in which the TCP was not added to the base grease. Thus the fretting wear resistance of these specimen greases could not be improved. On the other hand, the specimen grease of each of the examples C-1 through C-12 was excellent in the fretting wear resistance thereof.

INDUSTRIAL APPLICABILITY

The grease composition of the present invention has an excellent fretting wear resistance in a wide temperature region from low to high temperatures and particularly at low temperatures. Therefore it is possible to preferably utilize the grease composition of the present invention as grease for various mechanical parts such as parts aimed at restraining a relative motion of a fit-in portion of a shaft, a bolted portion, a riveted portion, a tapered coupler, and the like; and parts such as a rolling bearing, a sliding bearing, a ball bush, a spline bearing, a flexible shaft coupling, a universal joint, a constant velocity joint, a laminated leaf spring, a coil spring, an electric contact point, a valve, a valve seat, a wire rope, and the like which have a slight reciprocating motion. It is possible to preferably utilize the rolling bearing of the present invention as (1) the hub bearing, (2) the rolling bearing for supporting rotors of motors for industrial machines and electric equipments and rotors of motors for driving electric cars, and (3) the rolling bearing for supporting the main shaft, blade, and yaw of a wind power generator.

EXPLANATION OF REFERENCE NUMERALS AND SYMBOLS

1: deep groove ball bearing
2: inner ring
3: outer ring
4: rolling element
5: cage
6: sealing member
7: grease composition
8a, 8b: opening
11: hub ring
12: driving inner ring
13: outer ring (outward member)
14: rolling element
15: inner ring (inward member)
16: hub bearing
17: sealing member
18: sealing member
21: rotating shaft
22: winding
23: rotor
24: commutator
25: brush holder
26: brush
27: end frame
28: jacket
29: stator
31: wind power generator
32: rotor blade
33: rotor shaft
34: nacelle
35: bearing (rolling bearing)
36: speed-up gear
37: generator
38: tower
39: motor
40: reducer
41: inner ring
42: outer ring
43: rolling element
44: cage
45: bearing housing
46: seal
47: yaw pivotal seat bearing

The invention claimed is:

1. A rolling bearing, which is incorporated in a wind power generator,
said rolling bearing comprising a plurality of rolling elements interposed between an inner ring and an outer ring such that said rolling elements are capable of rolling;
a grease composition being packed inside a space, formed between said inner ring and said outer ring, in which said rolling elements are disposed,
said grease composition comprising a base oil, a thickener, and an additive,
wherein said base oil comprising synthetic oil having a kinematic viscosity at 40° C. of 300 to 600 mm²/s,
wherein said additive contains at least one kind selected from among a phosphite ester shown by a chemical formula (1) or a phosphite ester shown by a chemical formula (2); a content of said phosphite ester is 0.5 to 4 parts by weight for 100 parts by weight which is a total of an amount of said base oil and that of said thickener; and said additive contains neither phosphite esters other than said phosphite ester shown by said formula 1 or by said formula (2) nor phosphate esters having organic groups whose carbon number is not less than three:

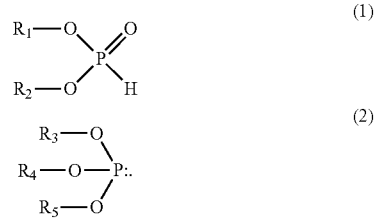

In chemical formulas (1) and (2), $R_1$, $R_2$, $R_3$, $R_4$, and $R_5$ denote a methyl group or an ethyl group $R_1$ and $R_2$ are the same group or different groups $R_3$, $R_4$, and $R_5$ are the same group or different groups.

2. A rolling bearing according to claim 1, wherein said phosphite ester is dimethyl phosphite, diethyl phosphite, trimethyl phosphite or triethyl phosphite.

3. A rolling bearing according to claim 1, wherein said thickener is a urea compound shown by a chemical formula (3):

[Chemical formula 3]

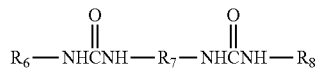

In chemical formula (3), $R_7$ denotes a divalent hydrocarbon group whose carbon number is 6 to 15, $R_6$ and $R_8$ denote monovalent hydrocarbon groups each containing an aromatic ring $R_6$ and $R_8$ are the same group or different groups.

4. A rolling bearing according to claim 1, wherein a worked penetration of said grease composition is 200 to 350.

5. A rolling bearing according to claim 1, wherein said thickener is at least one selected from among lithium soap and a urea compound.

6. A rolling bearing according to claim 1, which is a deep groove ball bearing, a roller bearing or an angular ball bearing.

7. A rolling bearing according to claim 1, which supports a main shaft, blade or yaw of a wind power generator.

* * * * *